US012808976B2

(12) United States Patent
Wu et al.

(10) Patent No.: US 12,808,976 B2
(45) Date of Patent: Nov. 24, 2026

(54) SYSTEMS AND METHODS FOR RADIO FREQUENCY INTERFERENCE SUPPRESSION IN RADAR

(71) Applicant: The University of Hong Kong, Hong Kong (CN)

(72) Inventors: Ed Xuekui Wu, Hong Kong (CN); Yujiao Zhao, Hong Kong (CN); Tze Lun Leong, Hong Kong (CN)

(73) Assignee: The University of Hong Kong, Hong Kong (CN)

(*) Notice: Subject to any disclaimer, the term of this patent is extended or adjusted under 35 U.S.C. 154(b) by 213 days.

(21) Appl. No.: 18/709,731

(22) PCT Filed: Dec. 1, 2022

(86) PCT No.: PCT/CN2022/135885
§ 371 (c)(1),
(2) Date: May 13, 2024

(87) PCT Pub. No.: WO2023/098809
PCT Pub. Date: Jun. 8, 2023

(65) Prior Publication Data

US 2025/0004094 A1 Jan. 2, 2025

Related U.S. Application Data

(60) Provisional application No. 63/284,765, filed on Dec. 1, 2021.

(51) Int. Cl.
*G01S 7/02* (2006.01)
*G06N 3/0464* (2023.01)

(52) U.S. Cl.
CPC ............ *G01S 7/023* (2013.01); *G06N 3/0464* (2023.01)

(58) Field of Classification Search
CPC .......... G01S 7/023; G01S 7/40; G01S 7/4026; G01S 7/0236; G01S 7/36; G01S 13/88;
(Continued)

(56) References Cited

U.S. PATENT DOCUMENTS 5,217,016 A * 6/1993 Axel .................. G01R 33/5673 324/309
5,473,332 A 12/1995 James et al.
(Continued)

FOREIGN PATENT DOCUMENTS

AU 2019321607 A1 2/2021
CN 103760541 A * 4/2014 ............... G01S 7/41
(Continued)

OTHER PUBLICATIONS

International Search Report and Written Opinion in corresponding International Application No. PCT/CN2022/135885, mailed Jan. 20, 2023.
(Continued)

*Primary Examiner* — Resha Desai
*Assistant Examiner* — Remash R Guyah
(74) *Attorney, Agent, or Firm* — Leason Ellis LLP

(57) ABSTRACT

A system for suppressing radio frequency interference (RFI) or electromagnetic interference (EMI) in a radar or magnetic resonance imaging system that scans target(s) with energy and receives signals that reflect or echo from the target(s). The system involves obtaining RFI/EMI data in the absence of signals of interest in the scanning system using at least one primary antenna and a plurality of reference antennas. The reference antennas are designed and arranged to detect RFI/EMI signals but not signals of interest in the scanning system. Simultaneously a model, e.g. CNN, is trained with the RFI/EMI data to determine the non-linear signal mappings among primary and reference antennas. The trained
(Continued)

model is applied to predict the RFI/EMI received by the primary antenna in the presence of signals of interest. Finally, the RFI/EMI signals received by the primary antenna are removed by subtracting out the predicted RFI/EMI.

8 Claims, 2 Drawing Sheets

(58) Field of Classification Search
CPC .......... G06N 3/0464; G06N 3/04; G06N 3/08; G01R 33/565; G01R 33/3607; G01R 33/583; H03H 21/00; H04B 1/10; H04B 15/00
USPC .................. 342/195, 16, 378; 324/309, 318; 375/346; 708/5
See application file for complete search history.

(56) References Cited

U.S. PATENT DOCUMENTS

| | | | | |
|---|---|---|---|---|
| 6,268,728 | B1 * | 7/2001 | Morrell | G01R 33/246 324/307 |
| 9,596,610 | B1 | 3/2017 | Borras et al. | |
| 9,797,971 | B2 | 10/2017 | Rearick et al. | |
| 10,317,502 | B2 | 6/2019 | Harvey et al. | |
| 2006/0232272 | A1 * | 10/2006 | Hanley | G01R 33/54 324/309 |
| 2007/0055142 | A1 * | 3/2007 | Webler | A61B 5/06 600/425 |
| 2010/0141508 | A1 * | 6/2010 | Nguyen | G01S 13/9017 342/159 |
| 2012/0252392 | A1 | 10/2012 | Wilkerson et al. | |
| 2016/0069968 | A1 * | 3/2016 | Rothberg | G01R 33/3802 324/322 |
| 2017/0108569 | A1 * | 4/2017 | Harvey | G01R 33/36 |
| 2019/0004137 | A1 * | 1/2019 | Harris | G01R 33/56572 |
| 2019/0056476 | A1 | 2/2019 | Lin | |
| 2020/0072931 | A1 * | 3/2020 | Zaiss | G01R 33/56 |
| 2020/0292660 | A1 | 9/2020 | Meissner et al. | |
| 2020/0341109 | A1 | 10/2020 | Meissner et al. | |

FOREIGN PATENT DOCUMENTS

| | | | |
|---|---|---|---|
| CN | 105144600 | A | 12/2015 |
| CN | 110045337 | A | 7/2019 |
| CN | 110208756 | A | 9/2019 |
| WO | 2008022441 | A1 | 2/2008 |

OTHER PUBLICATIONS

Huang Y, et al., "Efficient Narrowband RFI Mitigation Algorithms for SAR Systems With Reweighted Tensor Structures," IEEE Transactions on Geoscience and Remote Sensing, Nov. 2019;57(11), pp. 9396-9409.
Fridman PA et al., "RFI mitigation methods in radio astronomy," Astronomy & Astrophysics 2001;378(1), pp. 327-344.
Kingma, et al., "Adam: a Method for Stochastic Optimization," arXiv preprint arXiv: 1412.6980, Jan. 30, 2017, 15 pages.
Leshem, et al., "The effect of blanking of TDMA interference on radio-astronomical correlation measurements," Downloaded on May 16, 2024 from IEEE Xplore, 5 pages.
Jeffs, et al., "Auxiliary antenna-assisted interference mitigation for radio astronomy arrays," IEEE Transactions on Signal Processing, vol. 532, No. 2, Feb. 2005 pp. 439-451.

* cited by examiner

SYSTEMS AND METHODS FOR RADIO FREQUENCY INTERFERENCE SUPPRESSION IN RADAR

CROSS-REFERENCE TO RELATED PATENT APPLICATIONS

This application is a U.S. National Stage Application under 35 U.S.C. § 371 of International Patent Application No. PCT/CN2022/135885, filed Dec. 1, 2022, and claims the benefit of priority under 35 U.S.C. Section 119 (e) of U.S. Application No. 63/284,765, filed Dec. 1, 2021, all of which are incorporated herein by reference in their entireties. The International Application was published on Jun. 8, 2023 as International Publication No. WO 2023/098809 A1.

FIELD OF THE INVENTION

The present invention relates to radio frequency interference (RFI) suppression in radar systems and, more particularly, to the use of a deep learning approach to predict active RFI and to remove it.

BACKGROUND OF THE INVENTION

Radar determines the range from a target or targets by measuring the time delay between the transmitting signal and the received echo. Radar provides an active way to detect the range, angle or velocity of objects and has been used in numerous applications (e.g., navigation). However, the received echo is usually weak and thus can be easily contaminated by radio frequency interference (RFI), especially when the target is far away from the radar. See Huang Y, Liao G, Zhang L, Xiang Y, Li J, Nehorai, "A. Efficient Narrowband RFI Mitigation Algorithms for SAR Systems With Reweighted Tensor Structures," *IEEE Transactions on Geoscience and Remote Sensing* (2019); 57(11):9396-9409; and Fridman P A, Baan W A, "RFI mitigation methods in radio astronomy," *Astronomy & Astrophysics* (2001); 378 (1):327-344. In practice, a radar system is generally susceptible to radio frequency interference (RFI) emitted by other radiation sources within the same frequency band. Such RFI can be either broadband or narrow-band, corrupting the signal of interest in terms of raising the general noise level and/or generating spectral lines. It can arise from environmental sources in near or/and far fields. It can also come from the internal electronics of the radar system.

Traditional RFI suppression methods, such as temporal blanking and spatial filtering, are often performed to mitigate RFI in radar data. Temporal blanking is described in Leshem A and Veen A., "The effect of blanking of TDMA interference on radio-astronomical correlation measurements," *Proceedings of the IEEE Signal Processing Workshop on Higher-Order Statistics* (1999). This method uses a subsequent thresholding technique to blank RFI in the temporal domain. It is effective for strong RFI with short pulse durations. Spatial filtering is described in Jeffs B D, Li L and Warnick K F, "Auxiliary antenna-assisted interference mitigation for radio astronomy arrays," *IEEE Transactions on Signal Processing* 53.2, 439-451 (2005). This method uses a reference antenna to approximate the RFI received by a primary antenna through subspace projection.

These temporal blanking and spatial filtering methods often require high interference-to-signal-plus-noise ratio for sufficient RFI suppression. Additionally, their performances will be degraded for nonstationary interference. These methods are generally based on blind and relatively brutal signal processing without rigorously utilizing any priori information or physics available. Thus, they don't lead to complete or nearly complete RFI suppression.

A method has been proposed for removing electromagnetic interference (EMI) from magnetic resonance imaging (MRI) signals using deep learning techniques for suppressing artifacts in the magnetic resonance images. See, Patent No. AU2019321607A1, 2021, U.S. Pat. No. 9,797,971, WO2008022441A1 and U.S. Pat. No. 10,317,502.

SUMMARY OF THE INVENTION

The present invention is based on a conceptually new approach that uses active prediction via deep learning and subsequent removal of RFI signals. The deep learning based method for radio frequency interference (RFI) suppression in radar systems according to the present invention comprises the steps of: (1) obtaining RFI data in the absence of signals of interest using primary antennas and reference antennas, while the reference antennas are designed and arranged to detect RFI signals but not signals of interest; (2) simultaneously training a model with the RFI data to learn the non-linear signal mappings among primary and reference antennas; (3) applying the trained model to predict RFI received by the primary antennas in the presence of signals of interest; and (4) removing RFI signals received by primary antennas by subtracting out the predicted RFI.

Intuitively, such an accurate prediction model is highly feasible because of a simple electromagnetic phenomenon. That is, the properties of RFI signal propagations among any radiative (e.g., air) or/and conductive media (e.g., surrounding RFI emitting structures such as those from the internal electronics of a radar system itself) are fully dictated by the electromagnetic coupling among these media or structures. Such coupling relationships can be analytically characterized in a relatively simple manner by the frequency domain coupling or transfer functions among structures (e.g., primary and reference antennas). Further, a deep learning approach will yield a more robust prediction model given that both environmental and internal RFI signal sources can dynamically change.

This method of the present invention entails both computational algorithms (as described in steps (1)-(4) above) and design/deployment of reference radar antennas (as described in step (1) above), which are two key elements of this invention.

This invention offers an entirely new and effective approach to the suppression of RFI and improved radar signal quality. For example, it can enable a radar system to operate in complex electromagnetic environments or in the presence of active RFI-based jamming. This invention represents active RFI prediction and removal methods.

While the present invention is described with respect to a single primary antenna, it can be extended to radar data received with multiple primary antennas (i.e., antenna array). Also, the deep learning can be carried out by various alternative artificial neural network architectures, such as complex-valued convolutional neural networks, which can be used to build the non-linear relationship between primary and reference antennas.

BRIEF DESCRIPTION OF THE DRAWINGS

The foregoing and other objects and advantages of the present invention will become more apparent when considered in connection with the following detailed description and appended drawings in which like designations denote like elements in the various views, and wherein.

DETAILED DESCRIPTION

Figure 1A:
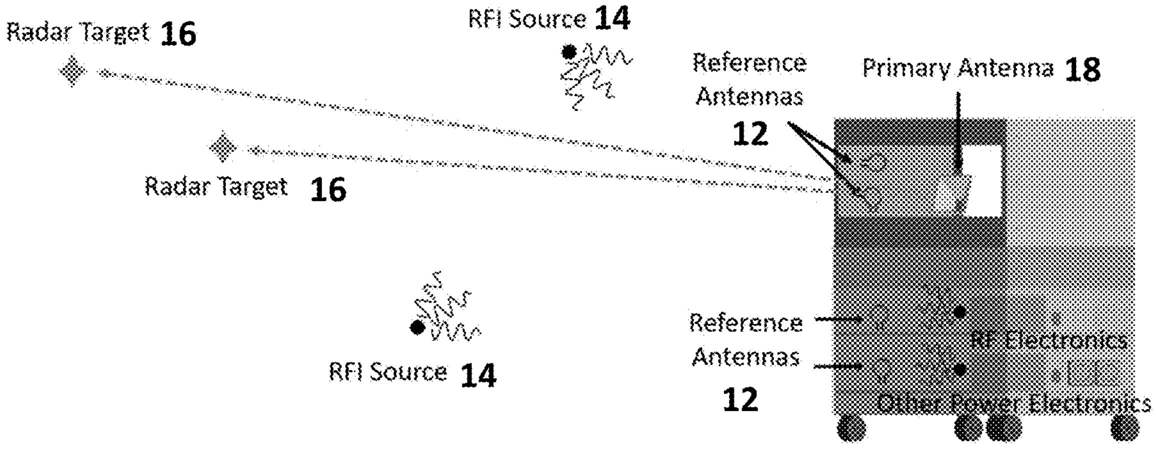
FIG. 1A is a diagram of a radar system that uses RFI signal suppression according to the present invention and FIG. 1B is a graph of the range profile amplitude versus range for a ground truth signal, a ground truth signal with RFI added and a ground truth signal with RFI added but suppressed according to the present invention.

The present invention uses reference antennas to simultaneously detect the RFI in the environment, and developed a deep learning method for RFI suppression in a radar system. This method derives a non-linear mapping between RFI received by primary and reference antennas with calibration data acquired during the idle time. Subsequently the system predicts the RFI received by the primary antenna in the presence of radar echo signals, creating an RFI-free echo prior to radar signal processing (e.g., target detection and imaging).

The implementation of the system can be explained as follows. Given a radar system with J primary antennas and K primary antennas, the received signal of the primary antenna j containing radar echo, RFI and hardware noise can be represented as:

$$h_j^i * i \text{ and } h_k^i * i,$$

where s and i denote signals reflected by the target and interference emitted by a nearby RFI source, respectively. Here $$h_j^s$$

and $$h_j^i$$

are impulse responses of the j-th primary antenna for the reflected signal and interference, and * is the convolution operator.

Similarly, for reference antenna k that detects RFI only, the receiving signal can be represented as:

$$h_j^i * i \text{ to } h_k^i * i$$

Note that the interference received by primary antenna j and reference antenna k, denoted as $$h_j^i * i \text{ and } h_k^i * i,$$

are correlated because the interference is generated by a common RFI source. Therefore, the interference in primary antenna j can be effectively suppressed if a mapping from $$h_j^i * i \text{ to } h_k^i * i$$

is known.

According to the invention a deep learning method is developed to establish the relationships between interference detected by primary and reference antennas. Specifically, one or more reference antennas are placed near the primary antennas. The locations and orientations of the reference antennas are strategically chosen such that they only detect the RFI, not the radar echo (i.e., signal reflected by the target). The primary and reference antennas simultaneously acquire signals during two temporal windows, one is for conventional radar echo acquisition and the other is for acquiring RFI characterization signals in the absence of any radar echoes (e.g., during the idle time). A convolutional neural network (CNN) is then trained using the RFI characterization signals to map the RFI received by the reference antennas to the RFI received by the primary antennas.

In evaluating the present invention, a system with 1 primary antenna and 4 reference antennas was simulated. The transmitting signal was a continuous stepped-frequency signal with a frequency swept from 32 GHz to 37 GHz, the number of frequency points was equal to 201 and the pulse width was equal to 100 us. The ground truth echo was generated using two ideal point targets, with distances from the primary antenna set to 1.6 m and 2.2 m, respectively. Gaussian noise was added to the ground truth echo to simulate hardware thermal noise. Four independent RFI sources emitted continuous single-frequency interferences with frequencies randomly generated within the frequency range from 32 GHz to 37 GHz. The impulse responses of the primary and reference antennas for each RFI source were randomly generated with a length of 20 (meters or feet?). The RFI was then added to the ground truth echo to evaluate the method of the present invention.

A 5-layer CNN was adopted to establish the relationships between interference detected by the primary and reference antennas. The respective kernel sizes of the five convolutional layers were 11×11, 9×9, 5×5, 1×1, and 7×7 with the corresponding number of kernels being 128, 64, 32, 32, and 2. Signals received by the primary and reference antennas within the RFI characterization window (i.e., RFI only) were utilized for training and validation. The split for the data samples was 85% for training and 15% for validation. Mean squared error loss was minimized using Adam optimizer with β1=0.9, β2=0.999, and initial learning rate=0.0005. See Kingma D P, Ba J. Adam, "A method for stochastic optimization," *Proceedings of the 3rd International Conference on Learning and Representations* (2015), which is incorporated herein by reference in its entirety. The CNN model was implemented with a batch size of 16 for 15 epochs. Signals received by the primary and reference antennas within the conventional radar echo acquisition window (i.e., echo+RFI) were utilized for the testing.

Figure 1B:
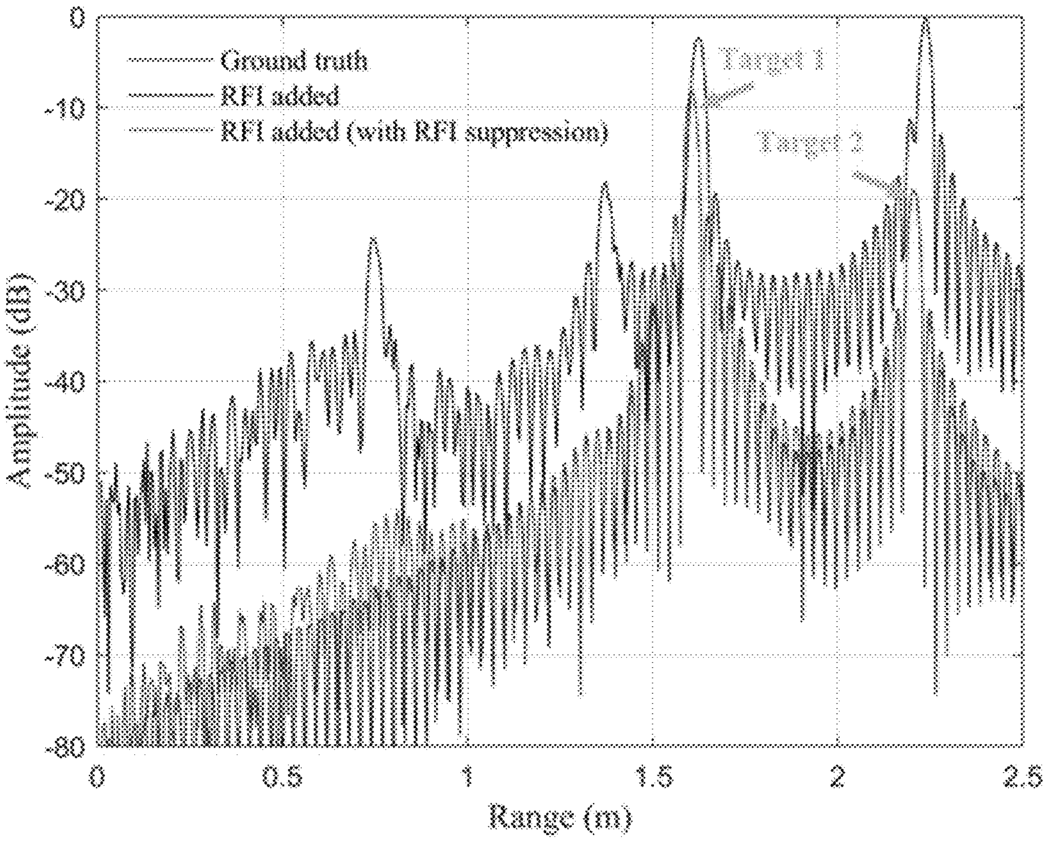

FIG. 1A and FIG. 1B show the RFI suppression for simulated radar data. The ground truth echo was generated using two ideal point targets 16 in FIG. 1A with distances of 1.6 m and 2.2 m away from the primary antenna 18 in FIG. 1A. RFI transmitted by 4 RFI sources 14 in FIG. 1A were then added to form the contaminated receiving signal. The RFI signals were simultaneously detected by primary antenna 18 and reference antennas 12 in FIG. 1A. The method effectively suppressed RFI while preserving the information of the real targets. Without adding any RFI, the distance between two targets and the primary antenna (i.e., 1.6 m and 2.2 m) can be clearly detected in FIG. 1A from the 1D range profile (blue graph). However, the receiving signal was heavily contaminated after adding RFI to the ground truth echo, leading to 4 fake targets (black graph). The RFI suppression results demonstrated that effective suppression for RFI generated by multiple sources, with a maximum suppression up to 30 dB while preserving the range information of the real targets (red graph).

Figure 2A:
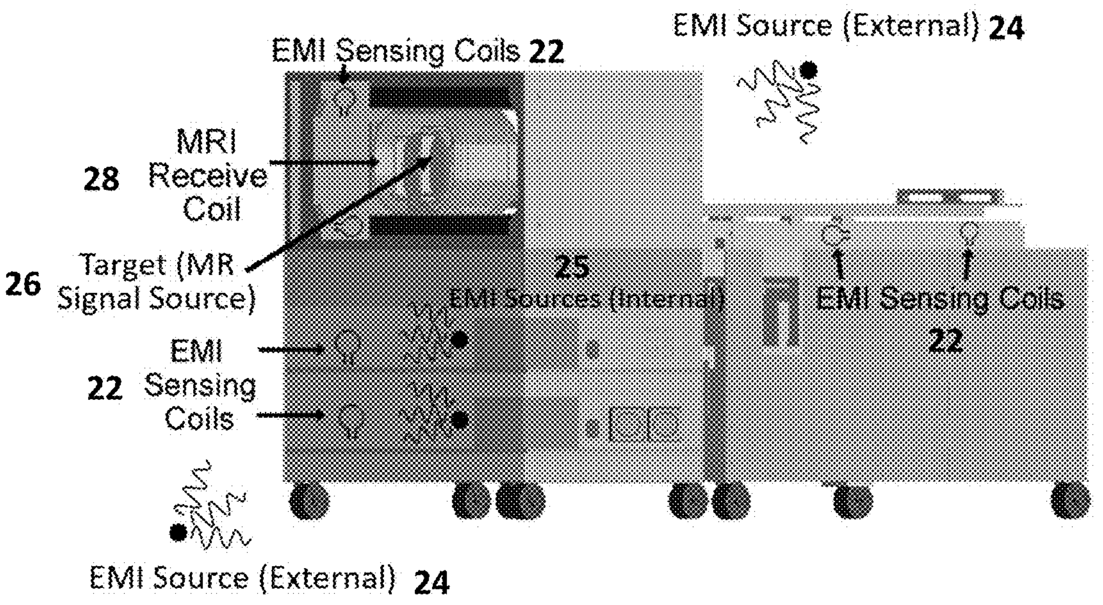
FIG. 2A is a diagram of equipment used for RFI signal suppression according to the present invention in the context of magnetic resonance imaging (MRI) without RF shielding and FIG. 2B is diagram of a deep learning driven method according to the present invention for prediction and elimination of electromagnetic interference (EMI) signals for a MRI scanner without any RF shielding.

FIG. 2A illustrates the equipment for the RFI (or electromagnetic interference EMI) signal prediction and elimination method in the context of magnetic resonance imaging (MRI) without RF shielding. This equipment has EMI sensing coils 22 at 6 locations spread throughout the equipment. Two are located near the MRI receive coil 28. EMI can be generated by external EMI sources 24, as well as internal EMI sources 25 (e.g., internal RF and gradient electronics).

Figure 2B:
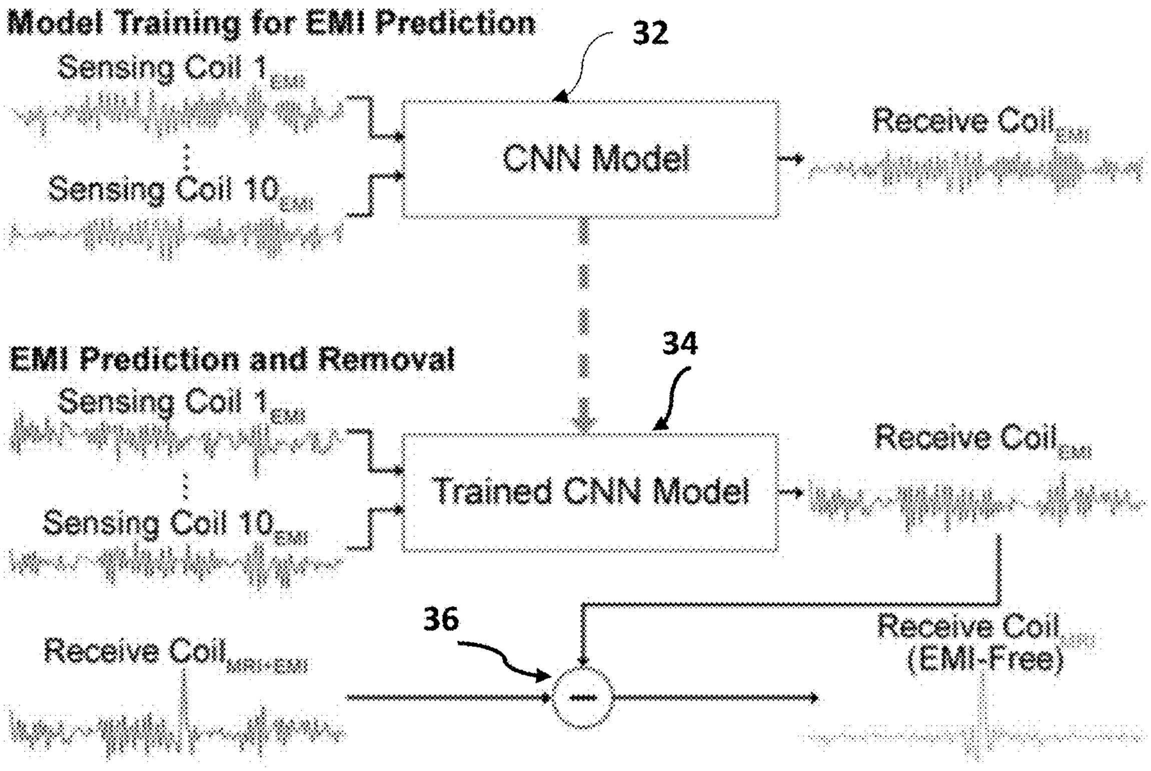

FIG. 2B is a diagram of a deep learning driven method according to the present invention for prediction and elimination of electromagnetic interference (EMI) signals for a MRI scanner without any RF shielding. Deep learning driven prediction and elimination of electromagnetic interference (EMI) signals for a MRI scanner without any RF shielding use signals from small reference or RF sensing coils/antennas. These EMI/RFI coils are radiofrequency (RF) coils, i.e., EMI sensing coils 22 (i.e. reference antennas) that are strategically placed in the vicinity of the primary or MRI receive RF coil 28 (i.e., primary antenna). They are designed to actively detect EMI/RFI signals only that are from both external environments and internal MRI electronics. After each MRI data acquisition, a CNN model 32 is trained to establish the relationship between the EMI/RFI signals received by MRI receive coil 28 (i.e., primary antenna) and the sensing coils 22 (i.e., reference antennas). The trained model 34 can then predict the EMI/RFI signal component detected by the MRI receive coil 28, i.e. the MRI signal from the signals simultaneously detected by the EMI sensing coils. The predicted EMI/RFI signal is subtracted at 36 from the MRI receive coil signal to produce the EMI-free MRI signals. The algorithm can be implemented in real time if needed.

The characteristics of EMI/RFI signals and their sources can change dynamically, such deep learning based model (as illustrated in FIG. 2B) may need to be further refined and expanded to include other features such as transfer learning in order to be more adaptive to various EMI/RFI characteristics during MRI scanning.

The CNN model illustrated in FIG. 2B is typically trained by data from sensing coils and receive coils in the absence of MRI signals. However, given that the MRI signals or radar signals are intrinsically weak when compared to EMI/RFI signals, the model can sometimes be trained directly by the data acquired during MRI or radar signal detection by sensing and receive coils.

While the invention is explained in relation to certain embodiments, it is to be understood that various modifications thereof will become apparent to those skilled in the art upon reading the specification. Therefore, it is to be understood that the invention disclosed herein is intended to cover such modifications as fall within the scope of the appended claims.

The invention claimed is:

1. A system method for suppressing radio frequency interference (RFI) in scanning systems that scan targets with energy and receive a signal that reflect reflects or echo echoes from the target(s), comprising the steps of:

simultaneously obtaining RFI data in the absence of signals of interest in the scanning system using at least one primary antenna and a plurality of reference antennas, wherein the reference antennas are designed and arranged to detect RFI signals but not signals of interest;

simultaneously:

(a) training a model with the RFI data to determine the non-linear signal mappings among primary and reference antennas; and (b) applying the trained model to predict RFI received by the at least one primary antenna in the presence of signals of interest; and removing RFI signals received by the at least one primary antenna by subtracting out the predicted RFI.

2. The method of claim 1, wherein the RFI data is obtained by locating the reference antennas near the primary antenna so that the locations, orientations, shielding environments and types of the reference antennas are such that they only detect the RFI, not the scanning system signal of interest that echo or reflect from the target.

3. The method of claim 1, wherein the primary and reference antennas simultaneously acquire signals during two temporal windows, one for acquisition of the echo signal from the target(s) and the other during an idle time when acquisition of RFI characterization signals occurs in the absence of any target echoes and training of the model occurs.

4. The method of claim 1, wherein the trained model is a convolutional neural network (CNN) based model trained using the RFI data to map the RFI received by the reference antennas to the RFI received by the at least one primary antenna.

5. The method of claim 1, wherein the scanning system is a radar system.

6. The method of claim 1, wherein the scanning system is a magnetic resonance imaging system.

7. The method of claim 2 wherein the types of the reference antennas are narrow beam or broad beam.

8. A system for suppressing radio frequency interference (RFI) in scanning systems that scan targets with energy and receive a signal that reflects or echoes from the target(s), comprising:

at least one primary antenna;

a plurality of reference antennas simultaneously obtaining RFI data in the absence of signals of interest in the scanning system, wherein the reference antennas are designed and arranged to detect RFI signals but not signals of interest; and an artificial neural network arranged as a prediction model and configured to be simultaneously (a) trained with the RFI data to determine a non-linear signal mapping among the at least one primary antenna and the plurality of reference antennas (b) predict RFI received by the at least one primary antenna in the presence of signals of interest, and (c) remove RFI signals received by the at least one primary antenna by subtracting out the predicted RFI.

* * * * *